United States Patent [19]
Bowerman

[11] 3,797,711
[45] Mar. 19, 1974

[54] DEVICE FOR METERING TOOTHPASTE OR THE LIKE

[76] Inventor: William R. Bowerman, 1824 Mississippi St., Lawrence, Kans. 66044

[22] Filed: Oct. 24, 1972

[21] Appl. No.: 300,116

[52] U.S. Cl. .............................. 222/219, 222/536
[51] Int. Cl. .............................................. B67d 3/00
[58] Field of Search .......... 222/206, 207, 216, 217, 222/218, 219, 531, 536, 537, 555

[56] References Cited
UNITED STATES PATENTS

| | | | |
|---|---|---|---|
| 3,394,850 | 7/1968 | Volkober | 222/219 |
| 2,085,669 | 6/1937 | Noyes | 222/219 |
| 3,388,839 | 6/1968 | Frydenberg | 222/219 |

FOREIGN PATENTS OR APPLICATIONS

| | | | |
|---|---|---|---|
| 563,607 | 10/1932 | Germany | 222/219 |
| 806,316 | 12/1936 | France | 222/219 |

Primary Examiner—Stanley H. Tollberg
Assistant Examiner—Joseph J. Rolla
Attorney, Agent, or Firm—Morse, Altman, Oates & Bello

[57] ABSTRACT

A metering device is provided for attachment to or as an integral part of the cap end of a tube of toothpaste or the like. The device comprises a cylinder open at both ends and a piston mounted for limited reciprocation within the cylinder. A bracket supports the cylinder for angular movement about an axis perpendicular to its long axis. The bracket is provided with a tapped passage which receives the threaded neck of the toothpaste tube and is adapted to communicate with either open end of the cylinder. Toothpaste discharged from the tube into one end of the cylinder will push the piston and any paste within the other end of the cylinder out through the opposite end of the cylinder in a metered amount and the piston closes off the end of the cylinder from air. The device is then rotated 180° for the next dispensing operation.

2 Claims, 4 Drawing Figures

PATENTED MAR 19 1974　　　　　　　　　　　　3,797,711

DEVICE FOR METERING TOOTHPASTE OR THE LIKE

BACKGROUND OF THE INVENTION

1. Field of the Invention

This invention relates generally to metering devices and more particularly is directed towards a new and improved self-sealing device for metering toothpaste or the like in precise, repeatable amounts.

2. Description of the Prior Art

Various types of devices have been developed for use in dispensing a pre-measured charge of material from a container. A number of such devices have been devised for use particularly with toothpaste and toothbrushes to insure that a proper amount of paste is applied to the brush. These devices have not been entirely satisfactory for various reasons such as complexity, undue manipulation, and lack of a tight seal when not in use.

Accordingly, it is an object of the present invention to provide a new and improved metering device for use in dispensing a pre-measured charge of material from a container without waste. Another object of this invention is to provide a toothpaste dispensing device of improved construction and operation and which eliminates the need of removing and replacing the toothpaste tube cap each time the tube is used.

SUMMARY OF THE INVENTION

This invention features a metering device for use with a tube of toothpaste or the like, comprising a bracket adapted to be connected to the neck of a toothpaste tube and a tubular cylinder mounted for angular movement to the bracket and adapted to be aligned with a passage formed in the bracket communicating with the open end of the tube. A piston is mounted within the cylinder for limited movement therealong. Toothpaste discharged from the tube into one end of the cylinder will push the piston and any paste within the other end of the cylinder out through the opposite end of the cylinder in a metered amount and the piston acts as a cap by closing the end of the cylinder from air. The device is then rotated 180° for the next dispensing operation.

DETAILED DESCRIPTION OF THE PREFERRED EMBODIMENT

Figure 1:
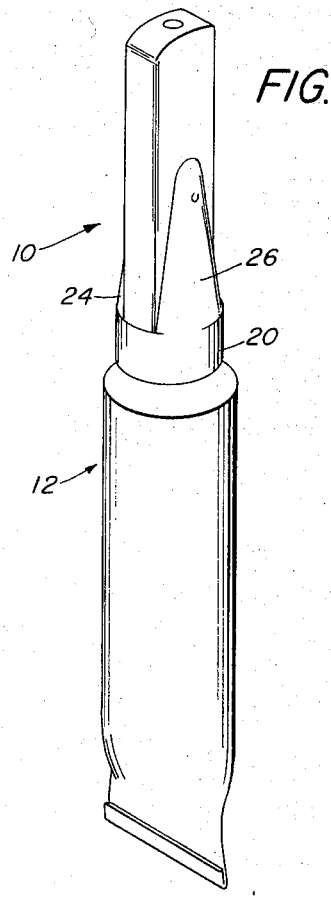
FIG. 1 is a view in perspective of a metering device made according to the invention.
Figure 2:
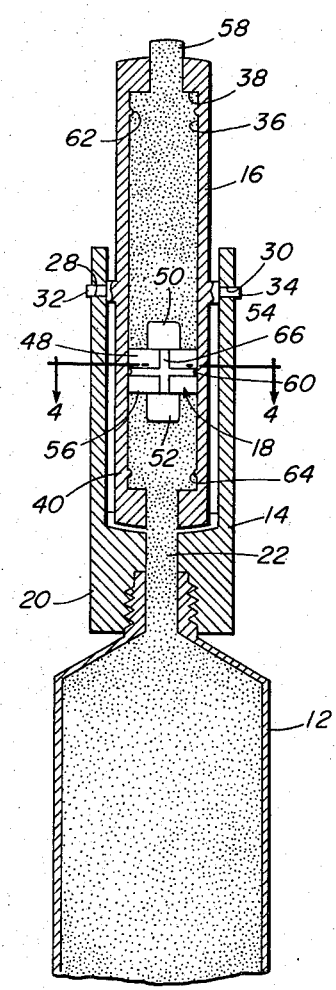
FIG. 2 is a sectional view in front elevation thereof.
Figure 3:
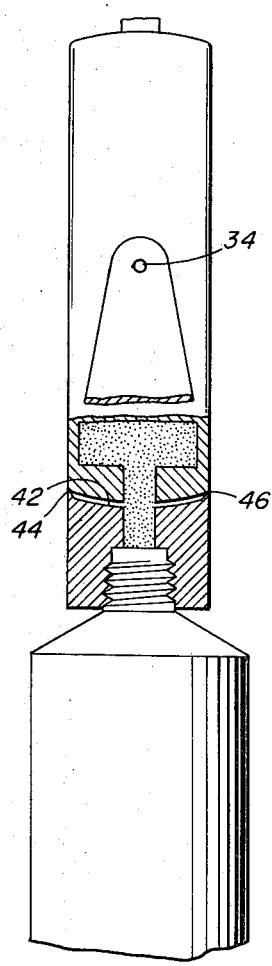
FIG. 3 is a view in side elevation partly broken away to show details of construction, and, FIG. 4 is a cross-sectional view taken along the line 4—4 of FIG. 2.
Figure 4:
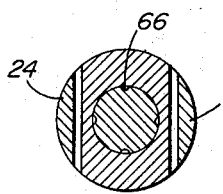

Referring now to the drawings, the reference character 10 generally indicates a metering device for use with a container 12 such as a tube of toothpaste, glue, cement, or the like. The device 10 includes a bracket or mount 14, a tubular cylinder 16 and a piston 18 mounted therein.

The bracket 14 is of bifurcated construction comprised of a base portion 20 formed with a tapped axial passage 22 and a pair of integral upstanding arms 24 and 26. The upper ends of the arms 24 and 26 are formed with openings 28 and 30 to receive stub shafts 32 and 34 extending perpendicularly from the midportion of the cylinder 16. The pivotal connection provided by the stub shafts, permits the cylinder 16 to be rotated about an axis perpendicular to its long axis so that either end of the cylinder may be brought into registration with the passage 22 in the bracket base 20.

The cylinder 16 is elongated and formed with an axial chamber 36 in which the piston 18 reciprocates. Both ends of the cylinder are open and formed with inner annular shoulders 38 and 40 which trap the piston within the chamber. The length of the cylinder is such that either end of the cylinder, when in registration with the opening 22, will snugly engage a concave shoulder 42 formed about the upper mouth of the passage 22 in the base 20. The terminal ends of the cylinder are somewhat convex to matingly engage with the concave shoulder 42. To further enhance the sealing action between the cylinder and the shoulder, the exposed edge about the passage 22 may be slightly raised at 44 and 46 to provide a tight seal.

The piston 18 is generally of a cylindrical configuration formed with a center portion 48 and reduced end portions 50 and 52. The configuration forms annular shoulders 54 and 56 at opposite sides thereof adapted to engage the shoulders 38 and 40 at either end of the cylinder. The length of the reduced portions 50 and 52 is sufficient to extend through the restricted openings at the ends of the cylinder to insure that all paste 58 in the cylinder is discharged. The reduced ends of the piston are dimensioned so that at either extreme position they will form a snug seal with the ends of the cylinder. The piston thus serves as a seal closure for the device to prevent the remaining contents in the tube and cylinder from drying out.

In order to keep the piston in place at each end of the cylinder, a weak locking action may be provided by means of an annular groove 60 formed in the center portion 40 of the piston and adapted to engage annular ribs 62 and 64 formed in the walls of the cylinder near opposite ends thereof.

Optionally, the outer surface of the center portion 48 of the piston may be formed with spaced longitudinal grooves 66 which allow a small amount of paste to pass between the piston and the walls of the cylinder to prevent the paste from becoming trapped in the corners of the cylinder and also to lubricate the piston.

The device is used by first removing the original cap from the tube 12 and connecting the bracket base over the threaded neck of the tube in the manner illustrated. The cylinder is then rotated so that either open end is in registration with the passage 22 which, in turn, is in registration with the open neck of the toothpaste tube. The tube 12 is then squeezed to force paste 58 up into the cylinder. This will push the piston to the upper end of the cylinder until the cylinder is filled. The device is now ready for use. When a charge of paste is desired, the cylinder 16 is rotated 180° so that the piston will now be at the bottom of the cylinder. The tube is again squeezed so that the paste, now being forced into the cylinder, will push the piston upwardly ejecting ahead of it that charge of paste 58 previously filling the chamber. Paste is forced into the chamber until the piston reaches its extreme upper position at which point it will stop and the metered amount of paste 58 will have been delivered from the device. At the same time, the cylinder will have received a fresh charge ready for dispensing on the next operation. Normally, the device will be kept on the cap with the piston in the uppermost position so as to provide a closure for the device. When it is desired to dispense additional paste, the user merely rotates the cylinder 180° and squeezes the tube.

The device is particularly useful for dispensing toothpaste since it prevents waste and insures that a proper amount of paste will be delivered each time. The device may also be used in connection with other paste-like materials such as cement, putty, glue or the like, where a charge of material is desired in exact metered amounts.

Various modifications will appear to those skilled in the art. For example, the bracket may be formed with an annular track attached to the tapped base with the cylinder mounted diametrically within the track by its ends. The cylinder may be rotated within the track to bring either end into register with the base passage and a port formed in the track 180° opposite the base passage. Also, the device may be formed integral with the tube rather than as an attachment.

Having thus described the invention what I claim and desire to obtain by Letters Patent of the United States is:

1. A device for metering a material such as toothpaste or the like from a squeeze container, comprising
   a. a mount formed with a passage for communication with the interior of said container, said mount including a pair of spaced parallel arms,
   b. a tube mounted for angular movement between said arms to permit either end thereof to be moved into registration with said passage,
   c. said tube being formed with an axial chamber therein and restricted openings at opposite ends thereof, and,
   d. a piston mounted for reciprocation in said chamber and adapted to be moved by material forced from said container into said tube,
   e. said piston being formed with a cylindrical center portion and reduced end portions of cylindrical configuration, the outer surface of said center portion being grooved in an axial direction and in a circumferential direction,
   f. said chamber being formed with a cooperative detent near each end thereof adapted to engage the circumferential grooves in said piston at the ends of its travel in said chamber.

2. A device according to claim 1 including sealing means between said mount about said passage, said sealing means including a raised edge formed adjacent said passage and engageable with an end of said tube.

* * * * *